April 24, 1928.  
J. D. FITZGERALD  
ROD COUPLER  
Filed April 22, 1926  
1,667,311  
2 Sheets-Sheet 1

WITNESSES:—

Inventor  
John D. Fitzgerald,  
Attorney

April 24, 1928.
J. D. FITZGERALD
ROD COUPLER
Filed April 22, 1926
1,667,311
2 Sheets-Sheet 2
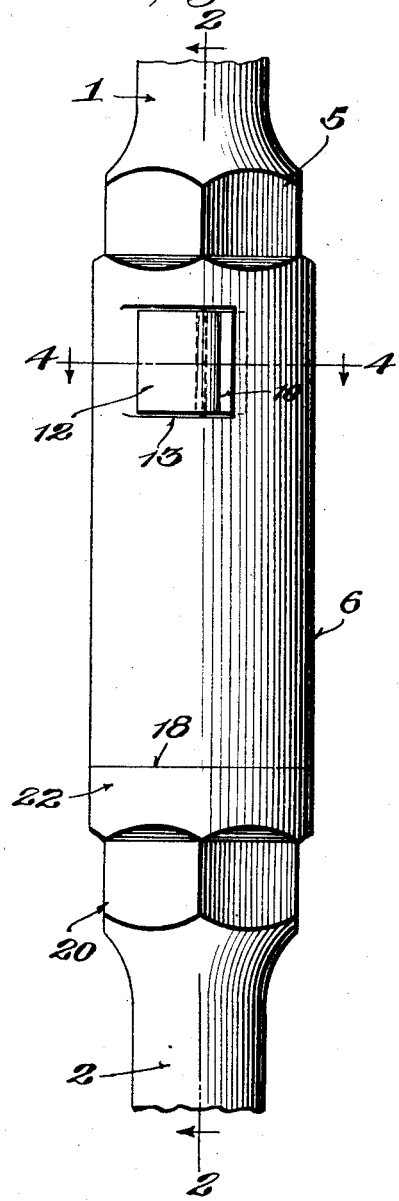
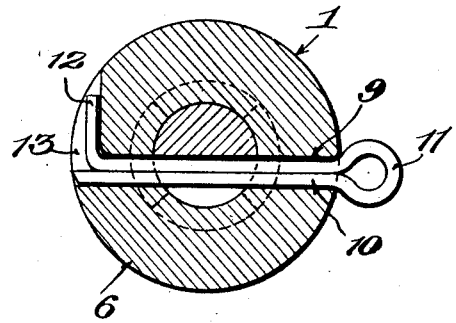
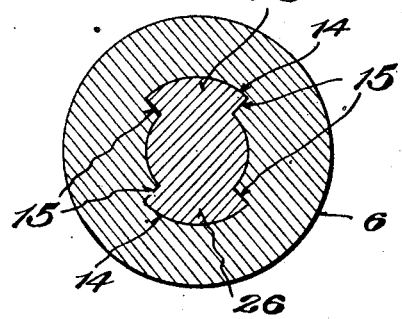
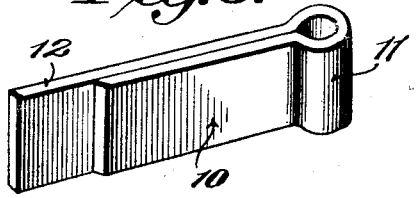
Inventor
John D. Fitzgerald, Patented Apr. 24, 1928.

1,667,311

UNITED STATES PATENT OFFICE.

JOHN D. FITZGERALD, OF SAN DIEGO, CALIFORNIA.

ROD COUPLER.

Application filed April 22, 1926. Serial No. 103,926.

This invention relates to rod couplers for drill or pump rods and the like, being particularly adapted for use in connecting the rods or sections of drill strings for boring oil or other wells.

In the use of well drilling and pumping apparatus, there is much financial loss incident to the loss of rods or tools due to inefficient connections. Therefore, with a view to overcoming this difficulty a primary object of the invention is to construct a rod coupler adapted to withstand the strains and strong resistance involved in its use without danger of accidental separation of the parts. That is to say, the invention contemplates a coupling wherein the inter-fitting parts accurately and closely engage to avoid looseness or play and provide a solid and rigid connection possessing great strength to withstand the great torque imposed on drill stems in drilling operations, while at the same time providing adequate safeguards to prevent longitudinal separation except when desired.

To that end the invention provides a coupler comprising interlockingly and detachably connected telescoping members of relatively stout proportions and ample length, and a removable key for locking them in their engaged position whereby the rod sections to be coupled may be quickly united or separated and when connected will be reliably held against separation.

In carrying out these objects the invention is susceptible of modification without departing from the spirit or sacrificing any of the advantages of the claimed invention; there being shown in the drawings for illustrative purposes a preferred and practical form, in which:

Fig. 3 is a side elevation thereof taken at a plane at right angles to Fig. 2.

Fig. 4 is a horizontal section taken on the line 4—4 of Fig. 3.

Fig. 5 is a similar view taken on the line 5—5 of Fig. 1, and

Fig. 6 is a detail perspective view of the locking key attached.

Similar reference characters represent corresponding parts throughout the several figures of the drawings.

Figure 1:
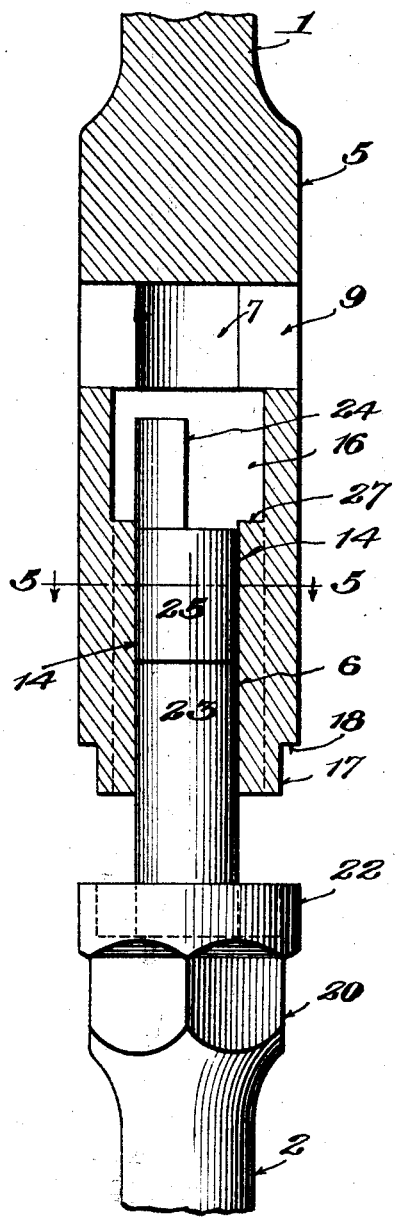
Figure 1 represents a longitudinal section of the coupler with the parts partially separated.

In the embodiment of the invention illustrated two rod sections 1 and 2 to be connected are shown equipped respectively one with an elongated head 5 and the other with a head 20 which heads are adapted for interlocking engagement to firmly and reliably connect the sections. The head 5 carried by section 1 and made integral therewith is in the form of a tubular receiving member 6 with a socket 7 at the inner end thereof. A key-way 9 extends transversely through the head 5 and intersects the socket or extended bore 7 and is designed to receive a key 10 preferably constructed of a strip of pliable metal folded intermediate its ends to provide a driving head 11 and having one arm 12 extended beyond the other and adapted to be bent laterally outward to lie in a recess 13 formed in the outer face of the head 5 and communicating with the key-way as is shown clearly in Fig. 4. This arrangement not only operates to hold the parts of the coupling in connected position but also protects or shields the locking element or keeper end element of the key and prevents its accidental release.

On the inner face of the tubular portion or cylinder 6 and extending inwardly from the outer end thereof are longitudinal grooves 14 and which have inwardly inclined side walls 15 for a purpose to be described. These grooves 14 communicate at their inner ends with a relatively enlarged chamber 16 which in turn communicates with the socket 7, and the bottom 27 of the chamber provides locking shoulders for the wings or projections 25—26 as will presently appear.

The receiving end of the cylinder 6 has a reduced tubular extension 17 with a shoulder 18 formed at its inner end on the outer face of the cylinder and which is designed for interlocking engagement with a cup-like member 21 carried by the head 20 and which is formed by an annular flange 22 spaced radially from the shank or stem 23 which projects longitudinally from the center of said head 20. Said shank or stem is of a length corresponding substantially to the length of the cylinder 6 and the width of the key-way 9 so that when said piston is inserted in said cylinder it will extend across the key-way 9 and into the socket 7. As shown the shank 23 is cut away at one side of its outer end to provide a locking face 24 for a distance substantially equal to the width of the keyway 9, and when this face alines with one side of the key-way 9 the key 10 can pass through the head 6 and lock the head 20 against turning.

Carried by the shank 23, intermediate the ends thereof, are a plurality of laterally extending coupling wings or projections 25 and 26 which correspond in length to the length of the chamber 16 and conform in shape and size to the groove 14 of the cylinder 6 to permit them to be entered. The wings or projections 25 and 26 and the groove 14 cooperate to guide the shank into the cylinder until the wings 25 enter the chamber 16 whereupon a quarter turn of either the shank or cylinder will cause the wings 25 and 26 to abut and interlockingly engage with the shoulder 27 formed at the bottom of the chamber 16 as is shown clearly in Fig. 2 and prevent withdrawal of the shank. This quarter turning to cause this interlocking engagement of the wings and shoulders also positions the cut-away portion 24 of said piston in alinement with the keyway 9 to provide for the insertion of the key 10 as is shown clearly in Figs. 2 and 4.

Figure 2:
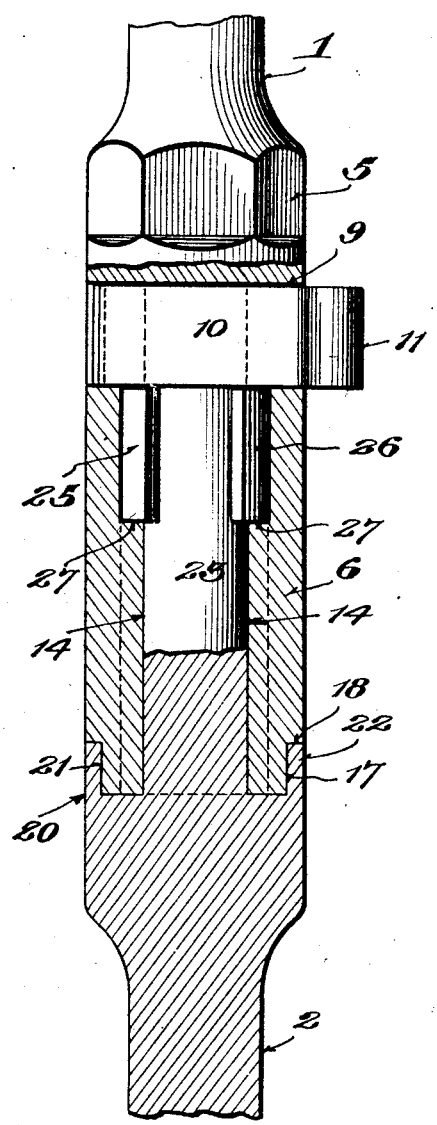
Fig. 2 is a similar view taken on the line 2—2 of Fig. 3 with the parts shown in connected operative position ready for use.

From the above description it will be seen that in the use of this coupler the tenon-like shank 23 is inserted within the cylinder 6 by positioning the wings 25 and 26 in the grooves 14 and moving said shank inwardly until said tongues clear the inner ends of the grooves and enter the chamber 16. When they have entered this chamber the tubular extension 17 of the socket member will have entered the cup-shaped member 21 of the head 20 as shown in Fig. 2. A relative quarter turn between the heads causes the wings 25 and 26 to engage behind the shoulders 27 and lock the members of the coupling against longitudinal movement relatively to each other. When in this position the lock is made secure by passing the key 10 into the key-way 9 through the cut-away portion 24 of the piston and then bending the long end 12 thereof laterally outward into the position shown in Fig. 4 where it is housed within the notch or recess 13.

When the parts of the coupling are in the position shown in Figs. 2, 3 and 4 they will be securely held against all possibility of separation until the key is manually removed which will permit the head members to be rotated relative to each other and the portion 23 withdrawn from the cylinder 6.

While this coupler is shown connecting two rod sections obviously it may be used equally as well as a pipe coupler.

It will also be understood that the parts 1 and 2 may be solid bar iron, as shown, or if the invention is applied to a hollow drill stem, the said parts may be of pipe formation, that is, hollow without changing the character or scope of the invention, and also if desired, the coupling may be adapted to connect sections of cable.

Without further description it is thought that the features and advantages of the invention will be readily apparent to those skilled in the art, and it will of course be understood that changes in the form, proportion and minor details of construction, may be resorted to, without departing from the spirit of the invention and scope of the appended claim.

I claim:

A coupler for rods and the like comprising socket and piston members adapted for telescopic engagement and respectively having cooperating groove and wing elements for interlocking engagement on the turning of one of said members relative to the other whereby said elements are held against longitudinal movement, said socket member having a transverse key-way extending therethrough and a recess formed at one end thereof, a locking face formed on the piston member and adapted to be rotated in alinement with the wall of the key-way, and a key adapted to be inserted in said key-way to engage said locking face and to have its extremity turned into said recess.

In testimony whereof I hereunto affix my signature.

JOHN D. FITZGERALD.